May 10, 1927. 1,628,465
L. J. HOUZE
GLASS GATHERING RING
Filed Nov. 20, 1926   2 Sheets-Sheet 1
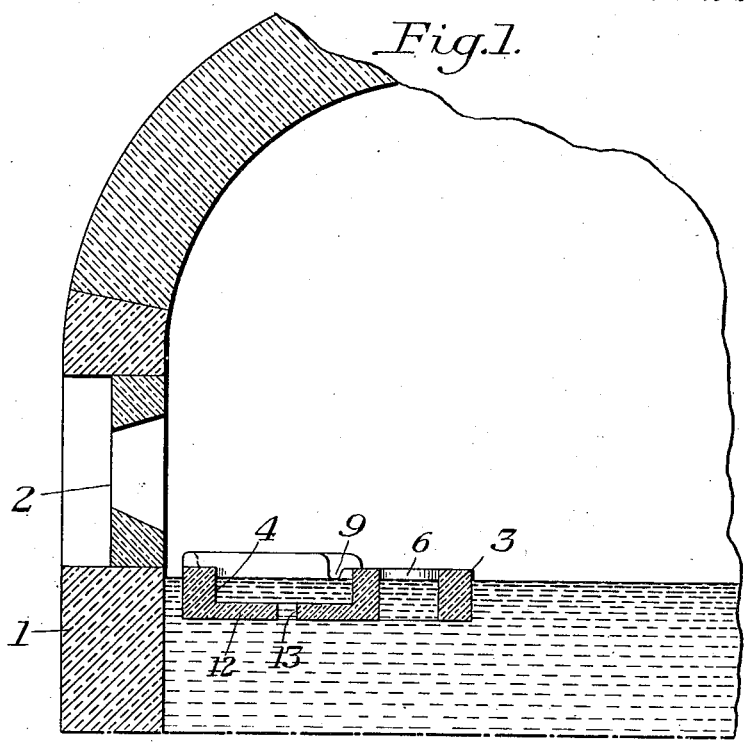
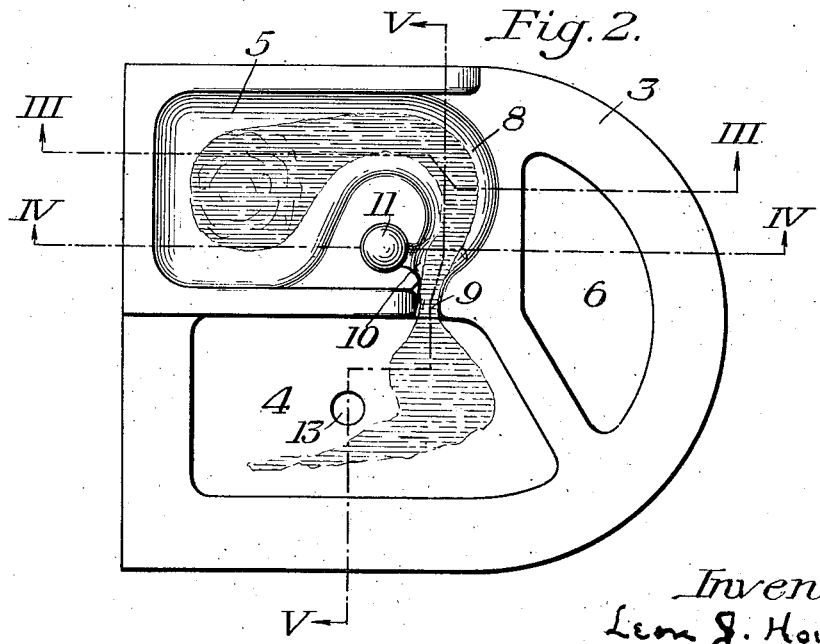
Inventor
Leon J. Houze,
by Christy & Christy,
Attys.

May 10, 1927.

L. J. HOUZE

GLASS GATHERING RING

Filed Nov. 20, 1926     2 Sheets-Sheet 2

1,628,465

Inventor
Leon J. Houze
by Christy & Christy
Attys.

Patented May 10, 1927.

1,628,465

UNITED STATES PATENT OFFICE.

LEON J. HOUZE, OF POINT MARION, PENNSYLVANIA.

GLASS-GATHERING RING.

Application filed November 20, 1926. Serial No. 149,638.

It is the object of the invention to provide a float or so-called gathering ring for the gathering of molten glass, equipped with means whereby a minor quantity of glass of a different color than that of the main molten body may be supplied to the surface of the molten body at a small area within the gathering opening, so that the operative may obtain a gather of the molten glass base with a minor quantity of molten glass of a different color picked up upon the surface of the gather. From the gather so obtained there may be formed, by either pressing or blowing, glass articles of variegated surface coloring, the colored glass on the surface of the gather being distributed over the glass base in varieties of adventitious patterns, producing an attractive ornamentation of the finished article. For this purpose I equip the float or gathering ring with a hearth or shelf, located adjacent to the gathering opening and in communication therewith, upon which shelf the colored glass may be melted and from which it will flow out upon the surface of the main molten body in the gathering opening.

Figure 3:
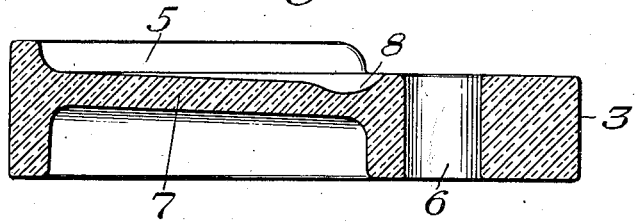
Figure 4:
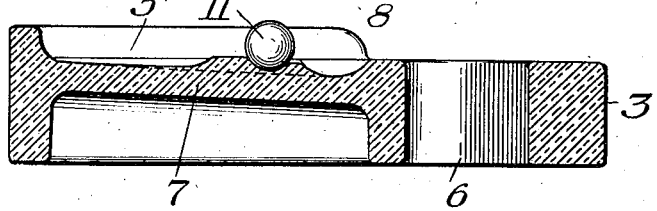
Figure 5:
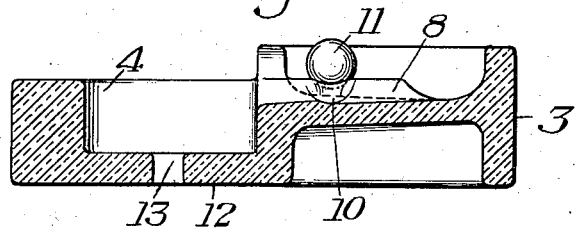
Figure 6:
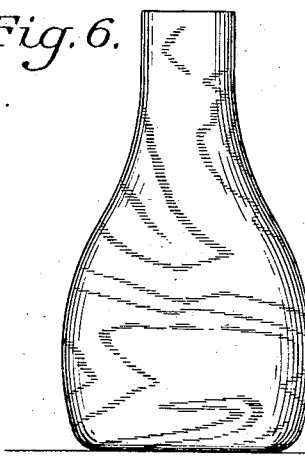

In the accompanying drawings Figure 1 is a fragmentary view of a portion of a tank furnace, showing the gathering ring in longitudinal section floating in the bath. Figure 2 is a plan view of the ring upon a larger scale. Figure 3 is a longitudinal section on the line III—III of Figure 2. Figure 4 is a longitudinal section on the line IV—IV of Figure 2. Figure 5 is a cross section on the line V—V of Figure 2. Figure 6 shows in elevation a blown glass article formed from the gather.

The furnace wall 1 is shown as having the gathering opening 2, and adjacent the opening and in the bath of molten glass is the floating gathering ring 3. This ring or float 3 has the gathering opening 4, and adjacent thereto is the hearth or shelf 5. The additional opening 6 is also cored out of the ring or float. The hearth or shelf 5 has a floor 7 that slopes inwardly toward the body of the furnace and merges into a channel 8 which slopes downwardly toward its outlet 9 which opens into one side of the gathering opening 4. Pieces of cold glass of the proper color are deposited upon the floor of the hearth 5 where they are melted, and the molten glass flows downwardly through the channel 8 and thence upon the surface of the molten body in the gathering opening 4. In gathering the glass the operative accumulates on his gathering iron the desired quantity of the molten glass within the ring and then at the end of the gathering operation he brings his gathering iron over into the area occupied by the minor quantity of the molten colored glass floating on the surface of the main body, and he thus accumulates upon the surface of his gather a small quantity of such colored glass. Then either in the blowing or the pressing operation, as the case may be, this quantity of colored glass is distributed over the surface of the base in variegated streaks of pleasing appearance, as generally shown in Figure 6.

In the accompanying drawings the portion of the ring from which the glass is gathered, termed above the gathering opening 4, is shown as also provided with a bottom floor 12, having an opening 13 for the flow of glass upwardly from the body of molten glass in the tank furnace. The reason for this is that the specific gravity of the glass melted on the hearth 5 is often greater than that of the molten glass of the bath in the furnace, in which case the glass from the hearth 5, sinking down into the base glass beneath it, will in time seriously discolor the latter. Therefore, by providing the floor 12 with the opening 13, the gatherer at each operation may collect the body of his gather at a point near where the glass from the body beneath exudes from the opening 13, thus getting a base gather free from discoloration. However, in many cases the bottom floor 12 need not be present, the gathering opening 4 being entirely open to the body of the glass in the tank.

Any suitable means may be employed for cutting off the flow of colored glass from the small melting hearth when desired. There is shown herein a small rest for a clay ball valve 11, and adjacent to the rest there is a notch 10 in the channel 8, so as to receive the ball in the channel. When it is desired to cut off the flow of the colored glass, the ball 11 is pushed out of its receptacle into the channel 8, and the flow is cut off.

It will be understood that the molten body in the furnace may be clear glass or glass of any desired color, or opaque glass, such as is generally known as opal glass. A glass of any desired different color may be melted on the hearth 5, or glass of two or more colors or varying tints may be melted on the hearth 5, and many varieties of ornamental coloring may be thus obtained on the surface of the finished article.

I claim as my invention:

1. A glass-gathering ring adapted to float in a body of molten glass having in combination a gathering opening and a hearth in communication with said opening.

2. In a glass-gathering ring, the combination with a gathering opening, of a melting-hearth having an inclined floor and a channel connecting the floor with the gathering opening.

3. In a glass-gathering ring, the combination of a gathering opening, a melting hearth, a channel connecting the hearth with the gathering opening, and movable means for interrupting the flow of glass in said channel.

4. In a glass-gathering ring, the combination of a gathering opening having a submerged floor provided with an orifice, of a melting-hearth in communication with said gathering opening.

In testimony whereof I have hereunto set my hand.

LEON J. HOUZE.